(12) United States Patent
Murakami

(10) Patent No.: US 9,027,056 B2
(45) Date of Patent: May 5, 2015

(54) VIDEO PROCESSING APPARATUS AND VIDEO PROCESSING METHOD

(75) Inventor: Masatoshi Murakami, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 124 days.

(21) Appl. No.: 13/311,280

(22) Filed: Dec. 5, 2011

(65) Prior Publication Data

US 2012/0194743 A1 Aug. 2, 2012

(30) Foreign Application Priority Data

Jan. 27, 2011 (JP) .................................. 2011-015365

(51) Int. Cl.
*H04N 21/482* (2011.01)
*H04N 21/433* (2011.01)
*H04N 21/472* (2011.01)

(52) U.S. Cl.
CPC ......... *H04N 21/482* (2013.01); *H04N 21/4334* (2013.01); *H04N 21/47202* (2013.01); *H04N 21/47214* (2013.01)

(58) Field of Classification Search
CPC .................................................. H04N 21/4532
USPC ............................................. 725/46; 384/581
See application file for complete search history.

(56) References Cited

U.S. PATENT DOCUMENTS

2002/0174430 A1* 11/2002 Ellis et al. ..................... 725/46
2009/0070817 A1* 3/2009 Ellis et al. ..................... 725/46

FOREIGN PATENT DOCUMENTS

| JP | 2007-179207 A | 7/2007 |
| JP | 2010-103622 A | 5/2010 |
| JP | 2011-013860 A | 1/2011 |

OTHER PUBLICATIONS

Office Action mailed Feb. 14, 2012 by Japanese Patent Office for corresponding Japan Application No. 2011-015365.
Final Office Action mailed Jul. 24, 2012 by Japanese Patent Office for corresponding Japan Application No. 2011-015365.
Decision of Rejection mailed Nov. 6, 2012 by Japanese Patent Office for corresponding Japan Application No. 2011-015365.

* cited by examiner

*Primary Examiner* — Jefferey Harold
*Assistant Examiner* — Sihar Karwan
(74) *Attorney, Agent, or Firm* — Patterson & Sheridan, LLP

(57) ABSTRACT

According to one embodiment, a video processing apparatus includes a content list display module, a content register and a controller. The content list display module is configured to display a list of contents capable of being acquired via a network. The content register is configured to register contents which are acquired via any of broadcasting, a recording medium and the network and on which any processing operation such as reproduction, record or reservation is performed. The controller is configured to change a display form of the contents registered in the content register into a different display form from other contents among the contents displayed in a list in the content list display module.

11 Claims, 9 Drawing Sheets

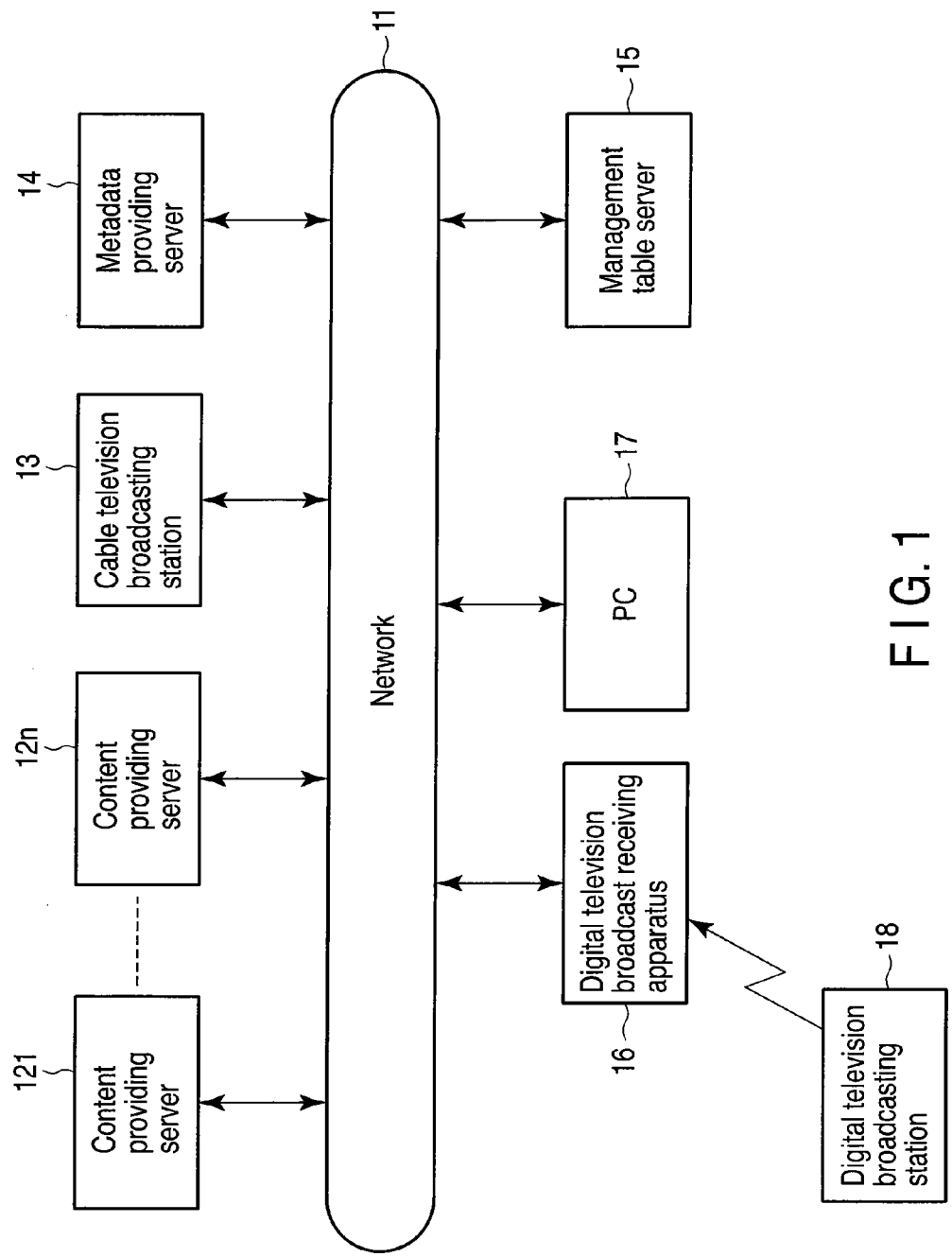
F I G. 1

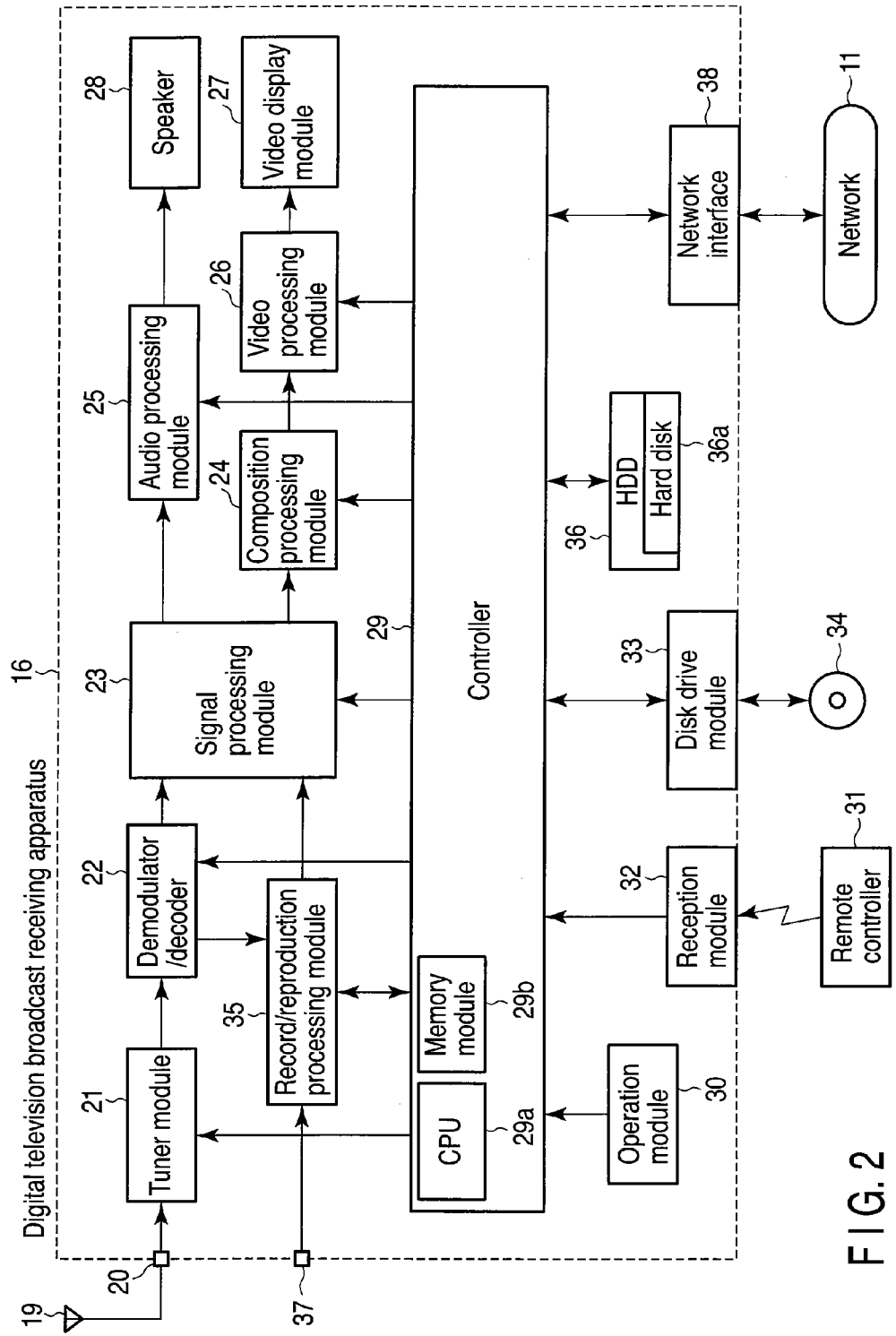
F I G. 2

Management table

| No. | Content name | Contents (state) |
|---|---|---|
| 1 | Come with the Wind | Viewed |
| 2 | Lunch at Tiffany's | Recorded |
| 3 | 30000 Leagues Under the Sea | Recording-reserved |
| 4 | Ali in Wonderland | Viewed |
| ⋮ | ⋮ | ⋮ |

F I G. 4

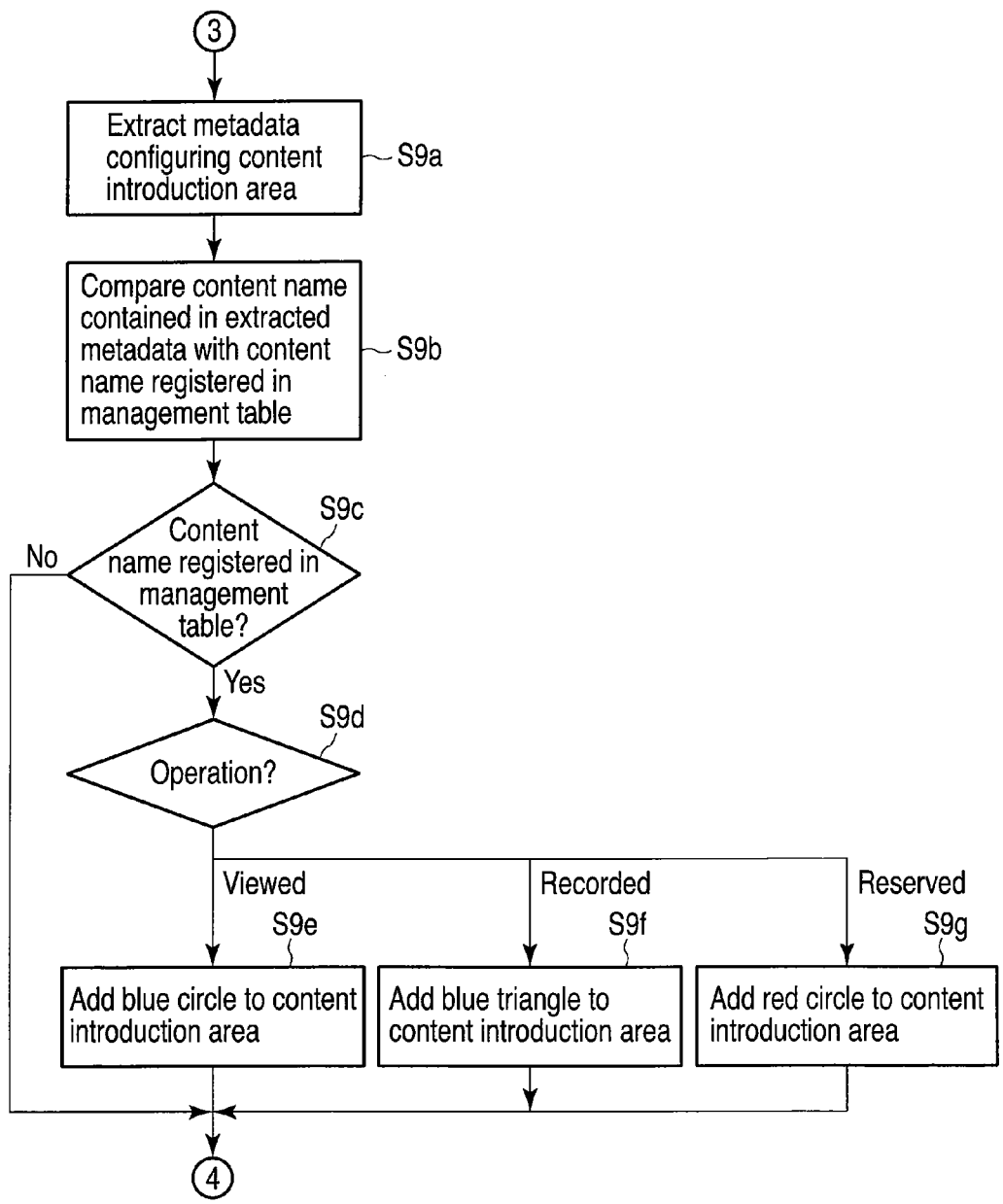
F I G. 9

VIDEO PROCESSING APPARATUS AND VIDEO PROCESSING METHOD

CROSS-REFERENCE TO RELATED APPLICATIONS

This application is based upon and claims the benefit of priority from prior Japanese Patent Application No. 2011-015365, filed Jan. 27, 2011, the entire contents of which are incorporated herein by reference.

FIELD

Embodiments described herein relate generally to a video processing apparatus and a video processing method configured to display a list of contents capable of being acquired via a network.

BACKGROUND

As is well known, in recent digital television broadcast receiving apparatuses, there is widely used not only the function of recording and reproducing received programs on a recording medium such as hard disk or optical disk but also the function of accessing a specific server via a network such as Internet and acquiring desired contents from the server for viewing, recording and reproducing the same.

The number of contents capable of being acquired via a network is vast, and even when the contents are retrieved in a narrowed range with set genre or keywords, the number thereof is still huge. Thus, even when many retrieved contents are displayed in a list, it is very difficult for a user to find desired contents therefrom.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a block structure diagram illustrating an exemplary network system according to an embodiment;

FIG. 2 is a block structure diagram illustrating one exemplary signal processing system of a digital television broadcast receiving apparatus configuring the network system according to the embodiment;

FIG. 4 is a diagram illustrating one exemplary management table stored in a management table server configuring the network system according to the embodiment;

FIG. 9 is a flowchart illustrating the remaining part of the main processing operations performed by the digital television broadcast receiving apparatus according to the embodiment.

DETAILED DESCRIPTION

Figure 3:
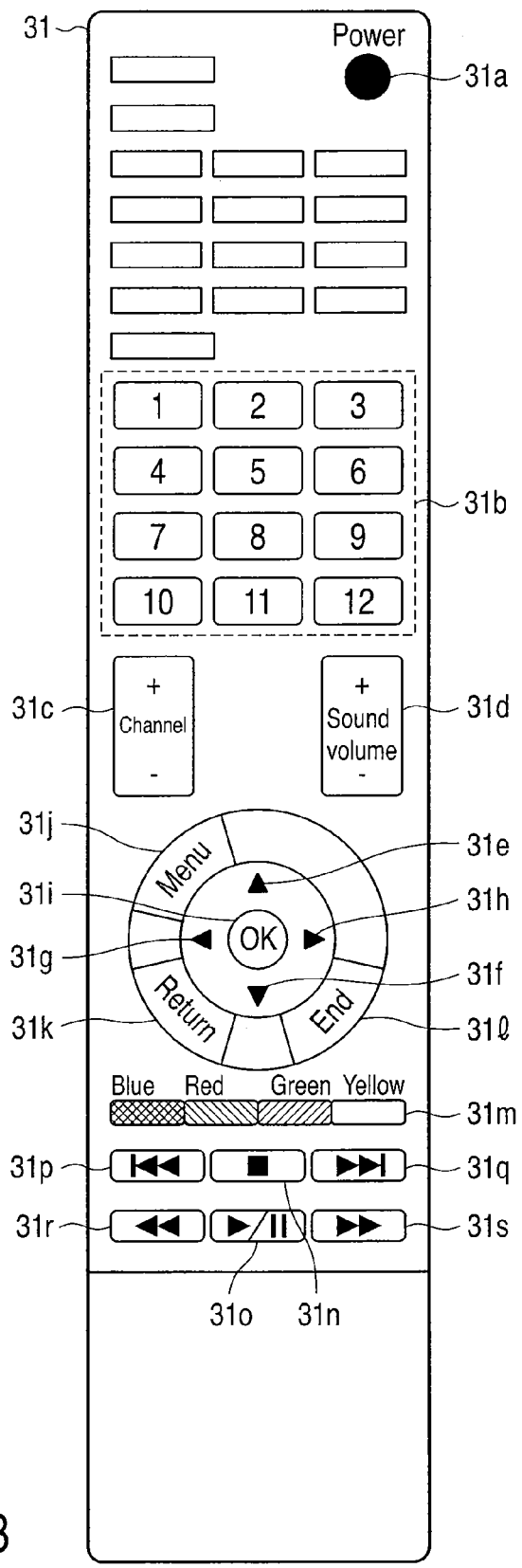
FIG. 3 is an outer profile diagram illustrating an exemplary remote controller configured to operate the digital television broadcast receiving apparatus according to the embodiment.

Various embodiments will be described hereinafter with reference to the accompanying drawings. In general, according to one embodiment, a video processing apparatus comprises a content list display module, a content register and a controller. The content list display module is configured to display a list of contents capable of being acquired via a network. The content register is configured to register contents which are acquired via any of broadcasting, a recording medium and the network and on which any processing operation such as reproduction, record or reservation is performed. The controller is configured to change a display form of the contents registered in the content register into a different display form from other contents among the contents displayed in a list in the content list display module.

FIG. 1 shows one exemplary network system described according to the embodiment. In other words, numeral 11 indicates a network such as Internet.

The network 11 is connected with multiple (n, in this case) content providing servers 121 to 12n managed by various content distributing companies. A cable television broadcasting station 13 is connected to the network 11.

The network 11 is connected with a metadata providing server 14 configured to provide metadata on contents such as films or music recorded on an optical disk such as a commercially-available Digital Versatile Disk (DVD) or Blu-ray Disk (BD).

The network 11 is connected with a management table server 15 configured to store therein a management table in which for a content on which the user has already viewed, recorded or reserved, a name of the content is associated with an operation thereof, which will be described later in detail.

The management table server 15 can be shared among many users making a contract with the management company and a management table is created per user, but the user can access only his/her own management table.

Whenever the user views, records or reserves new contents, the management table sequentially registers therein the content name and the operation such as view, record or reservation in an associated manner.

In this case, the contents registered in the management table are not limited to the contents acquired via the network 11 by the user, and may include all the contents on which the user has viewed, recorded or reserved such as contents received via television broadcasting or contents reproduced from an optical disk.

The network 11 is connected with many audiovisual (AV) devices and information terminals owned by many users, but FIG. 1 shows a state in which a digital television broadcast receiving apparatus 16 and a personal computer (PC) 17, both of which being owned by a specific user, are connected for convenience by way of example.

The digital television broadcast receiving apparatus 16 can receive television broadcasts transmitted from a digital television broadcasting station 18 and view, record and reserve the broadcast programs (contents), which will be described later in detail.

The digital television broadcast receiving apparatus 16 can selectively access the content providing servers 121 to 12n or the cable television broadcasting station 13 via the network 11, and acquire the contents distributed therefrom for viewing, recording and reserving the same.

The digital television broadcast receiving apparatus 16 can access the metadata providing server 14 via the network 11 and acquire metadata on desired contents therefrom.

The digital television broadcast receiving apparatus 16 creates the management table for all the contents on which it has performed various operations such as reproducing (user's viewing), recording and reserving.

The digital television broadcast receiving apparatus 16 can access the management table server 15 via the network 11 thereby to store or read the created management table in or from the management table server 15.

The PC 17 can also selectively access the content providing servers 121 to 12n or the cable television broadcasting station 13 via the network 11 thereby to acquire contents distributed therefrom for viewing, recording and reserving the same.

The PC 17 can access the metadata providing server 14 via the network 11 and acquire metadata on desired contents therefrom.

The PC 17 creates the management table for all the contents on which it has performed various operations such as reproducing (user's viewing), recording and reserving. In this case, since the users of the digital television broadcast receiving apparatus 16 and the PC 17 are the same, one management table in the management table server 15 can be shared.

In other words, for all the contents on which the digital television broadcast receiving apparatus 16 has performed various operations and all the contents on which the PC 17 has performed various operations, one management table in which a content name is associated with an operation is created and stored in the management table server 15.

The PC 17 can access the management table server 15 via the network 11 thereby to store or read the created management table in or from the management table server 15.

With the contract with the management company of the management table server 15, the same user can create individual management tables in the digital television broadcast receiving apparatus 16 and the PC 17, respectively, and store them in the management table server 15.

FIG. 2 schematically shows a signal processing system of the digital television broadcast receiving apparatus 16. In other words, a digital television broadcast signal received by an antenna 19 is supplied to a tuner module 21 via an input terminal 20 and thus a broadcast signal of a desired channel is selected. Then, the broadcast signal selected in the tuner module 21 is supplied to a demodulator/decoder 22 and is recovered into a digital video signal and a digital audio signal to be output to a signal processing module 23.

The signal processing module 23 performs predetermined digital signal processings on the digital video signal and the digital audio signal both of which being supplied from the demodulator/decoder 22, respectively. The signal processing module 23 outputs the digital video signal to a composition processing module 24 and outputs the digital audio signal to an audio processing module 25.

Among them, the composition processing module 24 superimposes an on-screen display (OSD) signal on the digital video signal supplied from the signal processing module 23 and outputs the OSD signal to a video processing module 26. The video processing module 26 converts the input digital video signal into a format for display on a video display module 27 in a later stage. Then, the video signal output from the video processing module 26 is supplied to the video display module 27 for video display.

The audio processing module 25 converts the input digital audio signal into an analog audio signal in a format reproducible by a speaker 28 in a later stage. The analog audio signal output from the audio processing module 25 is supplied to the speaker 28 for audio reproduction.

All the operations including various receiving operations described above in the digital television broadcast receiving apparatus 16 are collectively controlled by a controller 29. The controller 29 incorporates therein a central processing unit (CPU) 29a, and controls each module for reflecting the operation in response to operation information from an operation module 30 installed in the main body of the digital television broadcast receiving apparatus 16 or in response to operation information delivered from a remote controller 31 and received by a reception module 32, respectively.

In this case, the control module 29 utilizes a memory module 29b. The memory module 29b comprises a read only memory (ROM) configured to store therein control programs to be executed by the CPU 29a, a random access memory (RAM) configured to provide a work area to the CPU 29a, and a nonvolatile memory configured to store therein various items of setting information and control information.

The control module 29 is connected with a disk drive module 33. The disk drive module 33 is detachable with an optical disk 34 such as DVD or BD, and has a function of recording and reproducing digital data on and from the mounted optical disk 34.

Based on the user's operations of the operation module 30 and the remote controller 31, the controller 29 can control such that the digital video signal and the digital audio signal acquired from the demodulator/decoder 22 are encrypted by the recording/reproduction processing module 35 and converted into a predetermined recording format, and then are supplied to the disk drive module 33 to be recorded on the optical disk 34.

Based on the user's operations of the operation module 30 and the remote controller 31, the controller 29 can control such that the digital video signal and the digital audio signal are read from the optical disk 34 by the disk drive module 33 and decoded by the recording/reproduction processing module 35, and then are supplied to the signal processing module 23 to be supplied for the video display and the audio reproduction.

The controller 29 is connected with a hard disk drive (HDD) 36. Based on the user's operations of the operation module 30 and the remote controller 31, the controller 29 can control such that the digital video signal and the digital audio signal acquired from the demodulator/decoder 22 are encrypted by the recording/reproduction processing module 35 and converted into a predetermined recording format, and then are supplied to the HDD 36 to be recorded on a hard disk 36a.

Based on the user's operations of the operation module 30 and the remote controller 31, the controller 29 can control such that the digital video signal and the digital audio signal are read from the hard disk 36a by the HDD 36 and decoded by the recording/reproduction processing module 35, and then are supplied to the signal processing module 23 to be supplied for the video display and the audio reproduction.

The digital television broadcast receiving apparatus 16 is connected with an input terminal 37. The input terminal 37 is directed for directly inputting a digital video signal and a digital audio signal from the outside of the digital television broadcast receiving apparatus 16. The digital video signal and the digital audio signal input via the input terminal 37 are supplied to the signal processing module 23 via the recording/ reproduction processing module 35 under control of the controller 29, and then are supplied for the video display and the audio reproduction.

The digital video signal and the digital audio signal input via the input terminal 37 are supplied to the recording/reproduction processing module 35 under control of the controller 29, and then are supplied for recording/reproduction on/from the optical disk 34 by the disk drive module 33 or recording/ reproduction on/from the hard disk 36a by the HDD 36.

Based on the user's operations of the operation module 30 and the remote controller 31, the controller 29 can control such that for the disk drive module 33 and the HDD 36, the digital video signal and the digital audio signal recorded on the optical disk 34 are recorded on the hard disk 36a or the digital video signal and the digital audio signal recorded on the hard disk 36a are recorded on the optical disk 34.

The controller 29 is connected to the network 11 via a network interface 38. Thus, the controller 29 can access various servers 121 to 12n, 14, 15 and the cable television broadcasting station 13 on the network 11 based on the user's operations of the operation module 30 and the remote controller 31.

FIG. 3 shows an outer profile of the remote controller 31. The remote controller 31 is mainly provided with power key 31a, numeric keypad 31b, channel up/down key 31c, sound volume adjustment key 31d, cursor up-movement key 31e, cursor down-movement key 31f, cursor left-movement key 31g, cursor right-movement key 31h, OK key 31i, menu key 31j, return key 31k, end key 31l, four-color (blue, red, green, yellow) key 31m, and the like.

The remote controller 31 is provided with playback/stop key 31n, playback/pause key 31o, reverse skip key 31p, forward skip key 31q, fast-wind key 31r, fast-forward key 31s, and the like.

In other words, the playback/stop key 31n or the playback/ pause key 31o on the remote controller 31 is operated to enable reproduction, stop or pause to be performed on the disk drive module 33 or the HDD 36.

The reverse skip key 31p or the forward skip key 31q on the remote controller 31 is operated to enable the data such as video or audio read from the optical disk 34 or the hard disk 36 by the disk drive module 33 or the HDD 36 to be skipped in the reverse or forward direction relative to the playback direction by constant quantity, that is, to be subjected to the reverse skip or forward skip.

The fast-wind key 31r or the fast-forward key 31s on the remote controller 31 is operated to enable the data such as video or audio read from the optical disk 34 or the hard disk 36a by the disk drive module 33 or the HDD 36 to be continuously played back at a high speed in the reverse or forward direction relative to the playback direction, that is, to be subjected to fast-wind playback or fast-forward playback.

FIG. 4 shows one exemplary management table created by the digital television broadcast receiving apparatus 16 or the PC 17 and stored in the management table server 15. In other words, the management table describes therein registration numbers (No.) indicating the order of registration of the contents, content names, and user's operations on the contents are associated with one another, respectively.

Specifically, the registration number (No. 1) indicates that the content name is "Come with the Wind" and the operation is "viewed." That is, it is found that the content name "Come with the Wind" has been already viewed by the user.

The registration number (No. 2) indicates that the content name is "Lunch at Tiffany's" and the operation is "recorded." That is, it is found that the content name "Lunch at Tiffany's" has been already recorded by the user.

Further, the registration number (No. 3) indicates that the content name is "30000 Leagues Under the Sea" and the operation is "recording-reserved." That is, it is found that the content name "30000 Leagues Under the Sea" has been already reserved for record by the user.

Figure 5:
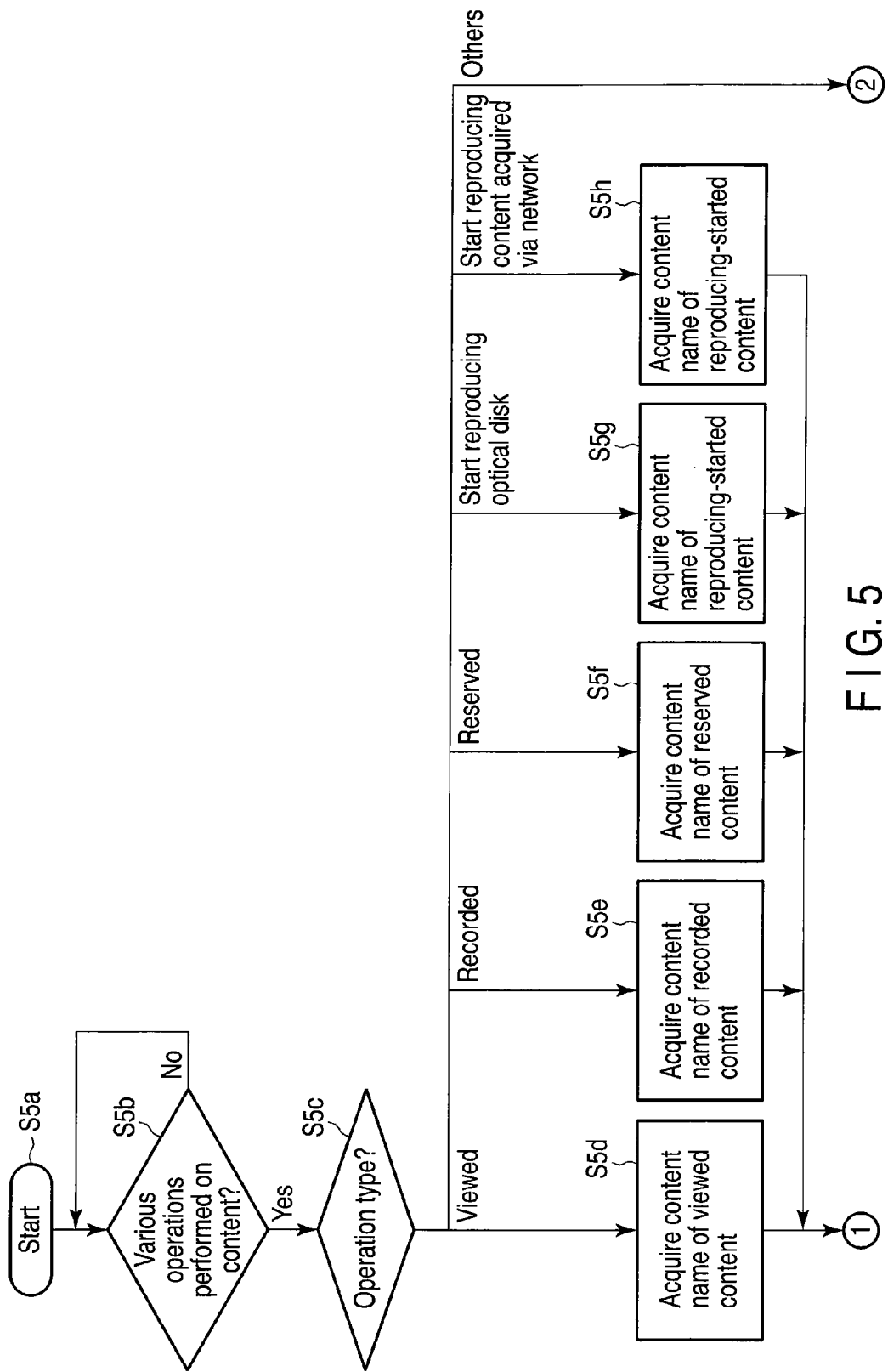
FIG. 5 is a flowchart illustrating part of management table creating operations performed by the digital television broadcast receiving apparatus according to the embodiment.
Figure 6:
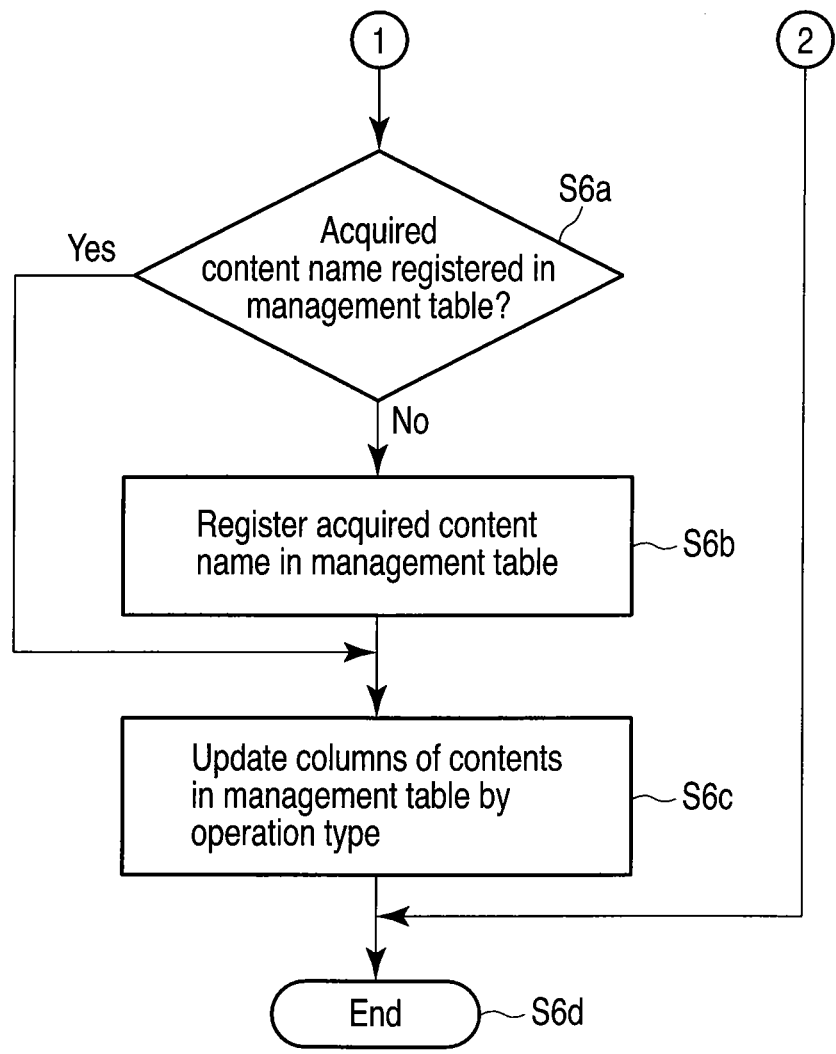
FIG. 6 is a flowchart illustrating the remaining part of the management table creating operations performed by the digital television broadcast receiving apparatus according to the embodiment.

FIGS. 5 and 6 show flowcharts collectively showing the processing operations of registering the contents on which the digital television broadcast receiving apparatus 16 has performed various operations such as reproduction, record and reservation in the management table. The processing operations of registering the contents on which the PC 17 has performed various operations in the management table is also the same and an explanation thereof will not be repeated here.

In other words, when the processing is started (step S5a), the controller 29 in the digital television broadcast receiving apparatus 16 decides in step S5b whether various operations such as reproducing (user's viewing), recording and reserving the content have been performed.

When it is decided that various operations such as reproducing, recording and reserving the content have been performed (YES), the controller 29 decides a type of the performed operation in step S5c. When it is decided that the operation type is completion of viewing, the controller 29 acquires the content name of the viewed content in step S5d.

In this case, if the viewed content has been broadcast by the digital television broadcasting station 18, the controller 29 can acquire the content name of the viewed content from the metadata contained in the service data broadcast by the digital television broadcasting station 18.

If the viewed content has been broadcast by the cable television broadcasting station 13, the controller 29 can acquire the content name of the viewed content from the metadata contained in the service data broadcast by the cable television broadcasting station 13.

When it is decided that the operation type is completion of recording, the controller 29 acquires the content name of the recorded content in step S5e. When it is decided that the operation type is completion of reserving, the controller 29 acquires the content name of the reserved content in step S5f. The content names can be acquired by the similar method for acquiring the content name of the viewed content.

When it is decided that the operation type is start of reproduction of the commercially-available optical disk 34 on which contents such as films or music are recorded, the controller 29 acquires the content name of the contents reproduced from the optical disk 34 in step S5g. The content name can be acquired by accessing the metadata providing server 14.

When it is decided that the operation type is start of reproduction of the content acquired via the network 11 from any of the content providing servers 121 to 12n, the controller 29 acquires the content name of the reproduced content in step S5h. The content name can be acquired from the metadata contained in the service data distributed from the content providing servers 121 to 12n.

When the operation type is other than completion of viewing, completion of recording, completion of reserving, start of reproduction of the optical disk 34 and start of reproduction of the content acquired via the network 11, the controller 29 terminates the processing (step S6d).

After step S5d, S5e, S5f, S5g or S5h, the controller 29 decides in step S6a whether the acquired content name has been registered in the management table, and when it is decided that the content name is not registered (NO), registers the acquired content name in the management table in step S6b.

After step S6b or when it is decided in step S6a that the content name has been registered in the management table (YES), the controller 29 updates the column of the contents (state) corresponding to the content name depending on the operation type decided in step S5c, in step S6c, and terminates the processing (step S6d).

For the processing in step S6c, specifically, the column of the contents (state) for the content name "30000 Leagues Under the Sea" at the registration number (No. 3) in the management table shown in FIG. 4 is "recording-reserved", but when the recording is completed by the recording-reservation, the column of the contents (state) is updated to "recorded."

It is assumed that while the management table is created and stored in the management table server 15, the user operates the operation module 30 or the remote controller 31 to access the content providing server 121 and requests the list of provided contents.

In this case, the contents to be requested to display in a list are assumed to be narrowed by user-set genre or keywords from all the contents capable of being provided by the content providing server 121.

Figure 7:
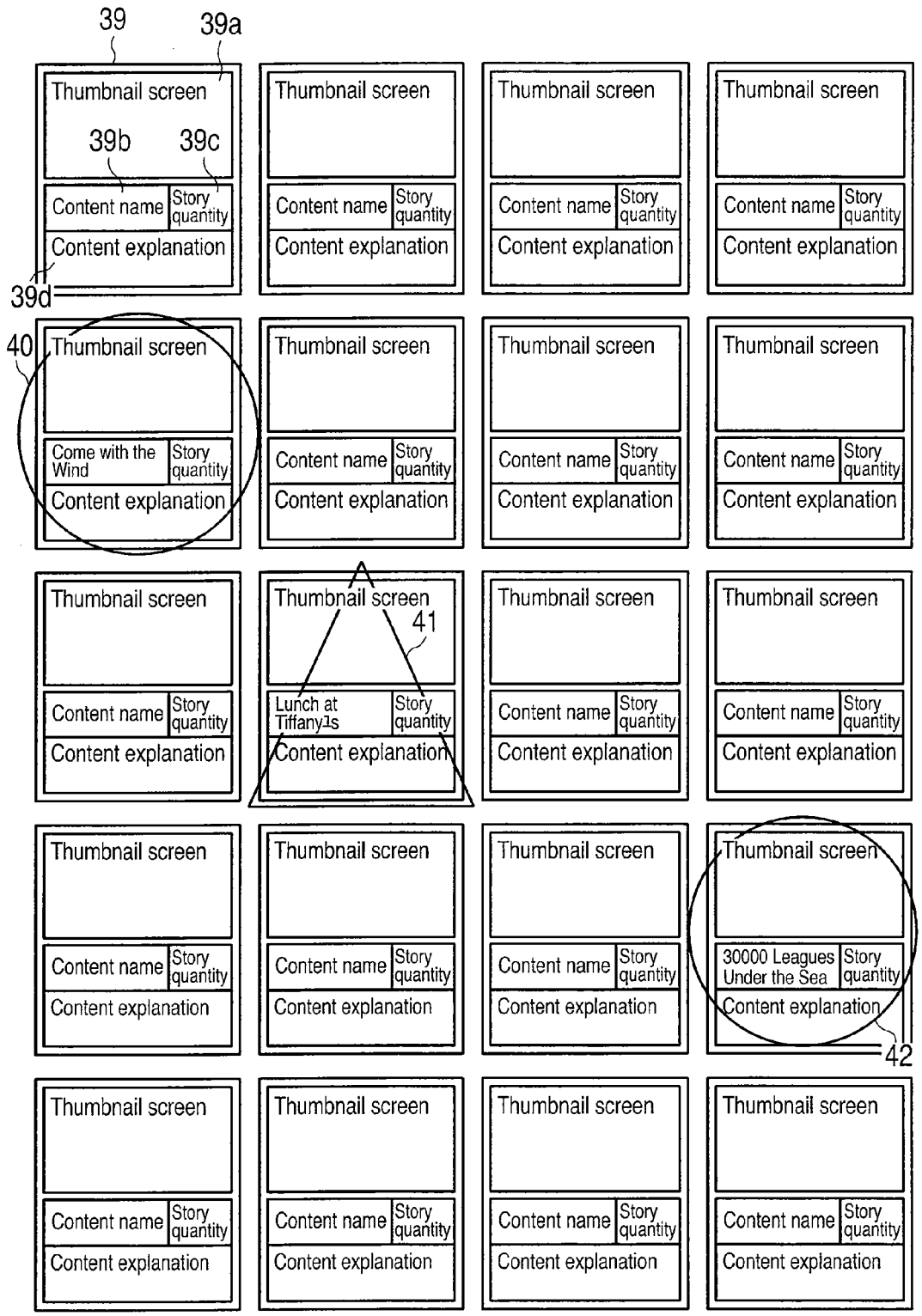
FIG. 7 is a diagram illustrating one exemplary content list display screen displayed on the digital television broadcast receiving apparatus according to the embodiment.

FIG. 7 shows an exemplary list of contents displayed on the video display module 27. In the exemplary list of contents, a plurality of content introduction areas 39 each for introducing one content are displayed in a matrix.

The content introduction areas 39 corresponding to all the contents cannot be displayed on the screen on the video display module 27 at one time, and the number of content introduction areas 39 capable of being displayed on the screen at one time is physically limited.

Therefore, the user selectively operates the cursor up-, down-, left-, or right-movement key 31e, 31f, 31g, or 31h on the remote controller 31 to scroll the contents displayed on the screen upward, downward, leftward or rightward so that the content introduction areas 39 corresponding to all the contents can be viewed.

The content introduction area 39 contains a thumbnail screen 39a for presenting typical videos in a content, a content name 39b, a story quantity 39c, a content explanation 39d on performers or story, and the like.

Various introduction contents contained in the content introduction area 39 is displayed based on the metadata contained in the service data distributed by the content providing server 121. In other words, to display multiple contents in a list is to display multiple contents in a list by the corresponding metadata.

A mark corresponding to the operation described in the management table is applied to the content introduction area 39 for the content name corresponding to the content name registered in the management table on the content list display screen, that is, on the screen in which the content introduction areas 39 corresponding to multiple contents are arranged.

Specifically, the content introduction area 39 in which the content name is "Come with the Wind" is marked with a blue circle 40 corresponding to the operation of "viewed." The content introduction area 39 in which the content name is "Lunch at Tiffany's" is marked with a blue triangle 41 corresponding to the operation of "recorded." The content introduction area 39 in which the content name is "30000 Leagues Under the Sea" is marked with a red circle 42 corresponding to the operation of "reserved."

In this way, when many contents capable of being acquired via the network 11 are displayed in a list by use of the corresponding content introduction areas 39, the mark 40, 41, 42 corresponding to the operation in the content introduction area 39 is added to the content on which the user has already performed various operation such as viewing, recording and reserving.

Thus, many contents capable of being acquired via the network 11 can be displayed in a list in an easy form on which a user's operation such as viewing, recording or reserving is reflected. Thereby, a user's work of retrieving a content can be facilitated.

Figure 8:
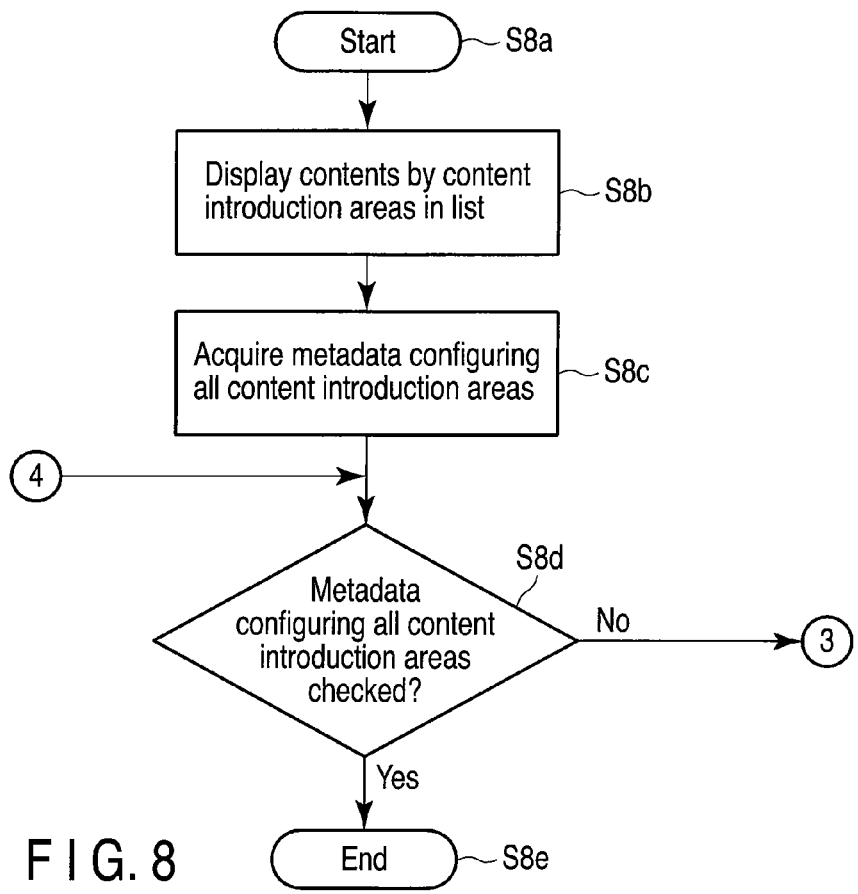
FIG. 8 is a flowchart illustrating part of main processing operations performed by the digital television broadcast receiving apparatus according to the embodiment.

FIGS. 8 and 9 show flowcharts collectively showing the processing operations of, when multiple contents are displayed in a list, adding the mark 40, 41 or 42 corresponding to the operation in the content introduction area 39 to the content on which the user has already performed various operations.

In other words, when the processing is started (step S8a), in step S8b, the controller 29 in the digital television broadcast receiving apparatus 16 accesses the content providing server 121 via the network 11 to display many contents capable of being acquired in the list of content introduction areas 39 configured of the metadata.

In step S8c, the controller 29 acquires the metadata configuring all the content introduction areas 39 displayed in the list.

Thereafter, in step S8d, the controller 29 decides whether the metadata configuring all the content introduction areas 39 displayed in the list has been checked, and it is decided that it is checked (YES), terminates the processing (step S8e).

When it is decided in step S8d that the metadata configuring all the content introduction areas 39 is not checked (NO), in step S9a, the controller 29 extracts the metadata configuring one content introduction area 39 in a preset order from among the metadata previously acquired in step S8c.

Then, the controller 29 compares in step S9b the content name contained in the extracted metadata with the content name registered in the management table, decides in step S9c whether the content name contained in the metadata is registered in the management table, and when it is decided that the content name is not registered (NO), proceeds to the processing in step S8d.

When it is decided in step S9c that the content name contained in the metadata is registered in the management table (YES), the controller 29 decides the operation described in the management table for the content with the content name in step S9d.

When it is decided that the operation is "viewed", the controller 29 adds the blue circle 40 to the content introduction area 39 corresponding to the content name in step S9e and proceeds to the processing in step S8d.

When it is decided that the operation is "recorded", the controller 29 adds the blue triangle 41 to the content introduction area 39 corresponding to the content name in step S9f, and proceeds to the processing in step S8d.

When it is decided that the operation is "reserved", the controller 29 adds the red circle 42 to the content introduction area 39 corresponding to the content name in step S9g, and proceeds to the processing in step S8d.

In the above embodiment, the management table is stored in the management table server 15 connected to the network 11 but is not limited thereto, and the management table may be stored in the digital television broadcast receiving apparatus 16 or the PC 17 owned by the user.

Of course, the display form in combinations of various colors and shapes may be employed for the marks 40, 41, 42 corresponding to the operations added to the content introduction area, not only blue or read circle or triangle. The operations are divided into viewing-reserved, recording-reserved and the like so that the operations can be displayed in a list which the user can easily understand.

In contrast, when the content on which any processing operation such as viewing, recording or reserving has been performed is displayed in a list without a discrimination among viewing, recording and reserving, the content introduction area 39 thereof may be displayed in gray so as not to be more visible than other content introduction areas 39. A content on which any processing operation such as viewing, recording or reserving has been performed may not be displayed in a list.

In other words, when many contents capable of being acquired via the network 11 are displayed in a list, a content on which the user has already performed any operation such as viewing, recording or reserving may be displayed in a different form from other contents.

It is convenient for the management table to have a function of collectively deleting the contents in consideration of the fact a large number of content names are increasingly registered and the digital television broadcast receiving apparatus 16 or the PC 17 may be sold to other person.

Figure 10:
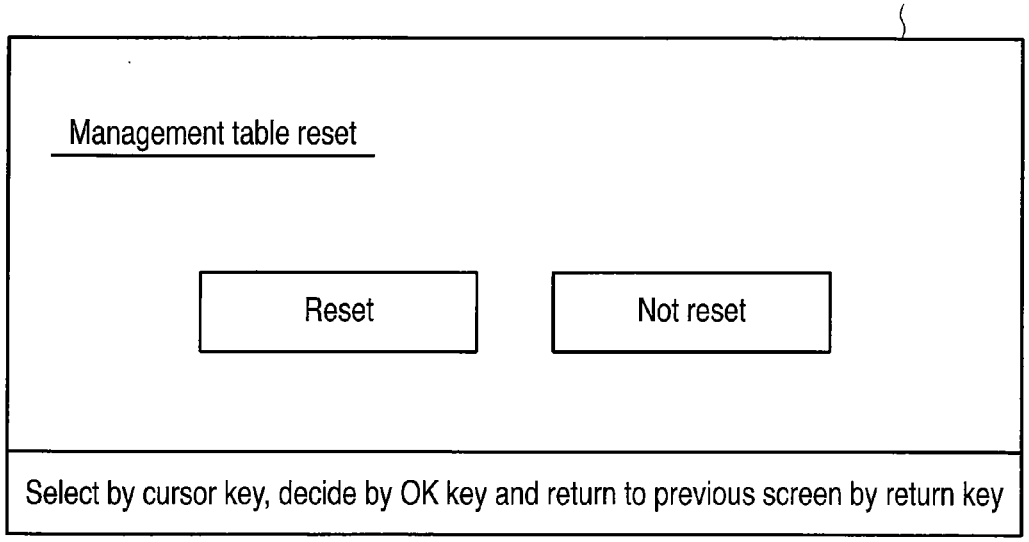
FIG. 10 is a diagram illustrating an exemplary management table reset screen displayed on the digital television broadcast receiving apparatus according to the embodiment.

The user operates the menu key 31j on the remote controller 31 to retrieve multiple menu screens in a hierarchy structure and displays the management table reset screen 43 on the video display module 27 as shown in FIG. 10 so that the function can be achieved.

In other words, the management table reset screen 43 displays therein two items including "reset" and "not reset", and the cursor left- and right-movement keys 31g and 31h on the remote controller 31 are selectively operated to select the item "reset" and to operate the OK key 31i so that the contents in the management table are collectively deleted.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric apparatus comprising:
a display circuitry to display information about a plurality of content items, wherein the content items are each accessible from at least one of a broadcast, a recording medium, and a network, the information is accessible over the network, and the information comprises metadata of the content items; and
a control circuitry to register a first content item and a second content item, wherein one or more processing operations have been performed on each of the first and second content items, and each processing operation is one of a plurality of processing operations that includes a reproduction operation, a recording operation, and a reservation operation, to add a first mark to the information about the first content item and a second mark to the information about the second content item when the first and second content items are respectively processed in accordance with the processing operations, and to display a management table reset screen indicating a reset button, wherein:
(i) the first mark indicates one of the processing operations performed on the first content item and the second mark indicates one of the processing operations performed on the second content item,
(ii) the first mark and the second mark are capable of indicating a distinction between the processing operations, and
(iii) the content items in the management table are collectively deletable when the reset button is operated in the displayed management table reset screen.

2. The electric apparatus of claim 1, wherein the control circuitry is configured to not add a mark to the information being displayed about a content item which is not processed in accordance with one of the processing operations.

3. The electric apparatus of claim 1, wherein the control circuitry is further configured to register a content name associated with one of the content items and a processing operation performed on the content item whenever any processing operation such as a reproduction operation, a recording operation, or a reservation operation is performed on the content item acquired via at least one of a broadcast, a recording medium, and the network.

4. The electric apparatus of claim 3, wherein the information is displayed in the form of a thumbnailed content item, and the thumbnailed content item has a thumbnailed content name corresponding to the content name registered in the control circuitry.

5. The electric apparatus of claim 1, wherein the network is the Internet.

6. The electric apparatus of claim 1, wherein the control circuitry is further configured to collectively delete the marks corresponding to one of the processing operations performed on one or more content items in response to a selection of a reset key on a reset screen, wherein the selection of the reset key collectively deletes the content items in the control circuitry, thereby erasing all the marks displayed by the display circuitry.

7. A video processing method comprising:
displaying information about a plurality of content items, wherein the content items are each accessible from at least one of a broadcast, a recording medium, and a network, the information is accessible over the network, and the information comprises metadata of the content items;
registering a first content item and a second content item, wherein one or more processing operations have been performed on each of the first and second content items, and each processing operation is one of a plurality of processing operations that includes a reproduction operation, a recording operation, and a reservation operation;
adding a first mark to the information about the first content item and a second mark to the information about the second content item when the first and second content items are respectively processed in accordance with the processing operations; and
displaying a management table reset screen indicating a reset button, wherein:
(i) the first mark indicates one of the processing operations performed on the first content item and the second mark indicates one of the processing operations performed on the second content item, (ii) the first mark and the second mark are capable of indicating a distinction between the processing operations, and (iii) the content items in the management table are collectively deletable when the reset button is operated in the displayed management table reset screen.

8. The video processing method of claim 7, further comprising the step of collectively deleting the marks corresponding to one of the processing operations performed on one or more content items in response to a selection of a reset key on a reset screen, wherein the selection of the reset key collectively deletes the content items in a control circuitry, thereby erasing all the marks displayed by a display circuitry.

9. The video processing method of claim 7, further comprising;

adding no mark to the information displayed about a content item which is not processed in accordance with one of the processing operations.

10. The video processing method of claim 7, wherein the step of registering further comprises registering a content name of the first or second content item and a processing operation performed on the first or second content item whenever any processing operation such as a reproduction operation, a recording operation or a reservation operation is performed on the first or second content item acquired via at least one of the broadcast, the recording medium, and the network.

11. The video processing method of claim 10, wherein the information is displayed in the form of thumbnailed content items, and the thumbnailed content items have thumbnailed content names corresponding to the content names of the content items.

* * * * *